United States Patent [19]
Emmons et al.

[11] Patent Number: 5,709,794
[45] Date of Patent: Jan. 20, 1998

[54] LOW-COST PORTABLE WATER FILTER

[75] Inventors: David James Emmons, Plymouth; Timothy Jordan Prescott, Minneapolis; Daniel Theodore West, Crystal, all of Minn.

[73] Assignee: Recovery Engineering, Inc., Minneapolis, Minn.

[21] Appl. No.: 444,614

[22] Filed: May 19, 1995

[51] Int. Cl.$^6$ .......................... B01D 29/05; B01D 39/20
[52] U.S. Cl. ...................... 210/351; 210/416.1; 210/478; 210/491
[58] Field of Search .................. 210/350–352, 210/266, 416.1, 491, 478

[56] References Cited

U.S. PATENT DOCUMENTS

| | | | |
|---|---|---|---|
| 4,080,294 | 3/1978 | Edwards et al. | 210/351 |
| 4,237,014 | 12/1980 | Trott | 210/352 |
| 5,106,500 | 4/1992 | Hembree et al. | 210/266 |
| 5,268,093 | 12/1993 | Hembree et al. | 210/136 |
| 5,470,470 | 11/1995 | Leyat | 210/350 |

OTHER PUBLICATIONS

The Fisher Catalog, 93/94, pp. iii, 724–727, 731–736.
Four color photos of Gelman Vented Polycarbonate 47mm Inline Holder shown on p. 724 of above Fisher catalog.
Cole–Parmer Catalog, 1995–1996, pp. ii–iii, 356–357, 362–363.
PŪR Product Information Brochure for Water Microfilter, Recovery Engineering, Inc., copyright 1993.
Cross–sectional figure of Water Microfilter shown in above PŪR Brochure.
Four color photos of FILOPUR portable water filter.

*Primary Examiner*—Thomas G. Wyse
*Attorney, Agent, or Firm*—Merchant, Gould, Smith, Edell, Welter & Schmidt, P.A.

[57] ABSTRACT

A low-cost portable water treatment device having a low-cost replaceable filter. The device includes a housing having an inlet, an outlet and a water filtration chamber. The replaceable filter is disposed in the water filtration chamber and comprises a disk having a compressible peripheral portion. The device includes a mechanism for compressing the peripheral portion to seal the filter and a mechanism for forcing contaminated water through the filter and out the outlet. The device also includes a storage compartment for a spare filter. Methods for manufacturing the low-cost filter and for sealing the filter in the device are disclosed.

22 Claims, 3 Drawing Sheets

LOW-COST PORTABLE WATER FILTER

FIELD OF THE INVENTION

This invention relates generally to portable water treatment devices, and more particularly to a simple, low-cost portable water filter, a low-cost replaceable filter media, and methods of manufacturing and sealing the filter media.

BACKGROUND OF THE INVENTION

Portable water treatment devices are well known in the art. These devices are typically used by campers, hikers, fishermen, etc., to produce potable water by eliminating contaminants from a fresh water source, such as a lake or river.

Portable water treatment devices can treat water by the use of mechanical filtration and/or chemical treatment. Chemical treatment media (e.g., charcoal, ion exchange resins) are generally considered more reliable for purifying water with respect to contaminants which are small on the micron scale. As a result, a combination of mechanical and chemical media are often used in the same system to assure removal of both the larger contaminants, such as suspended solids, and the much smaller contaminants, such as bacteria, viruses and volatile organic compounds. The devices and media of such systems, however, tend to be relatively complex and expensive. Even where only a mechanical filter is used, the media is typically relatively thick (e.g., pleated) and must be sealed with end caps.

The media in portable water treatment devices are either permanently contained in the device or replaceable. From a cost standpoint, it is preferable that the media be replaceable. This reduces cost because the remainder of the device is not thrown away when the media has reached its capacity. Devices with replaceable media must have a system for sealing the media in the device to prevent leaking and contamination of purified water. The sealing system is preferably simple so that the user can easily replace the media and be assured that the media is properly sealed.

What has been needed is a simple, low-cost portable water filter having a low-cost replaceable filter media. What has also been needed is an easy-to-manufacture filter media for use in such devices, which is simple to replace and which provides a reliable seal. What has also been needed is a portable water filter having a compartment for storing a spare filter media.

SUMMARY OF THE INVENTION

According to the present invention, a low-cost portable water treatment device having a replaceable filter is provided.

In one aspect of the invention, the water treatment device includes a pump body having a plunger chamber for receiving contaminated water, and a cover releasably connected to the pump body to define a water filtration chamber therebetween. The cover has an outlet for purified water. A replaceable filter is provided in the water filtration chamber and comprises a disk having a compressible peripheral portion disposed between first and second annular sealing surfaces. The peripheral portion of the filter is compressed by the cover and pump body when the cover is connected to the pump body. A plunger received within the plunger chamber forces contaminated water from the plunger chamber, into the water filtration chamber and through the filter to produce purified water exiting from the outlet of the cover.

In another aspect of the invention, the portable water treatment device includes a housing having an inlet, an outlet and a water filtration chamber. A replaceable filter is disposed in the water filtration chamber and comprises a disk having a compressible peripheral portion. The device includes a mechanism for compressing the peripheral portion to seal the filter and a mechanism for forcing contaminated water into the inlet, through the filter and out the outlet, thereby producing purified water.

In yet another aspect of the invention, the portable water treatment device comprises a housing, a replaceable filter sealed therein, and a plunger for forcing contaminated water through the replaceable filter to produce purified water. The housing has a storage compartment connected thereto for holding a spare filter.

Also according to the present invention, a filter for water filtration is provided. The filter comprises a disk including fibrous material and having a peripheral portion impregnated with a sealant. The impregnated peripheral portion is compressible so as to provide a seal.

Also according to the present invention, a method of manufacturing a filter for water filtration is provided. In the method, a sheet having fibrous material therein is provided. A disk is cut from the sheet. A peripheral portion of the disk is impregnated with a sealant to create an impregnated peripheral portion which is compressible so as to provide a seal.

Also according to the present invention, a method of sealing a filter in a portable water filtration device is provided. The device has first and second annular sealing surfaces. In this method, a filter comprising a disk having a compressible peripheral portion impregnated with a sealant is provided. The filter is inserted into the portable water treatment device. The impregnated peripheral portion of the filter is compressed between the first and second annular sealing surfaces, thereby sealing the filter in the water treatment device.

These and other advantages and features of novelty which characterize the invention are pointed out with particularity in the claims annexed hereto. However, for a better understanding of the invention and its advantages, reference should be made to the drawings which form a further part hereof, and to the accompanying descriptive matter in which there is illustrated and described a preferred embodiment of the invention.

DETAILED DESCRIPTION OF THE PREFERRED EMBODIMENT

Figure 1:
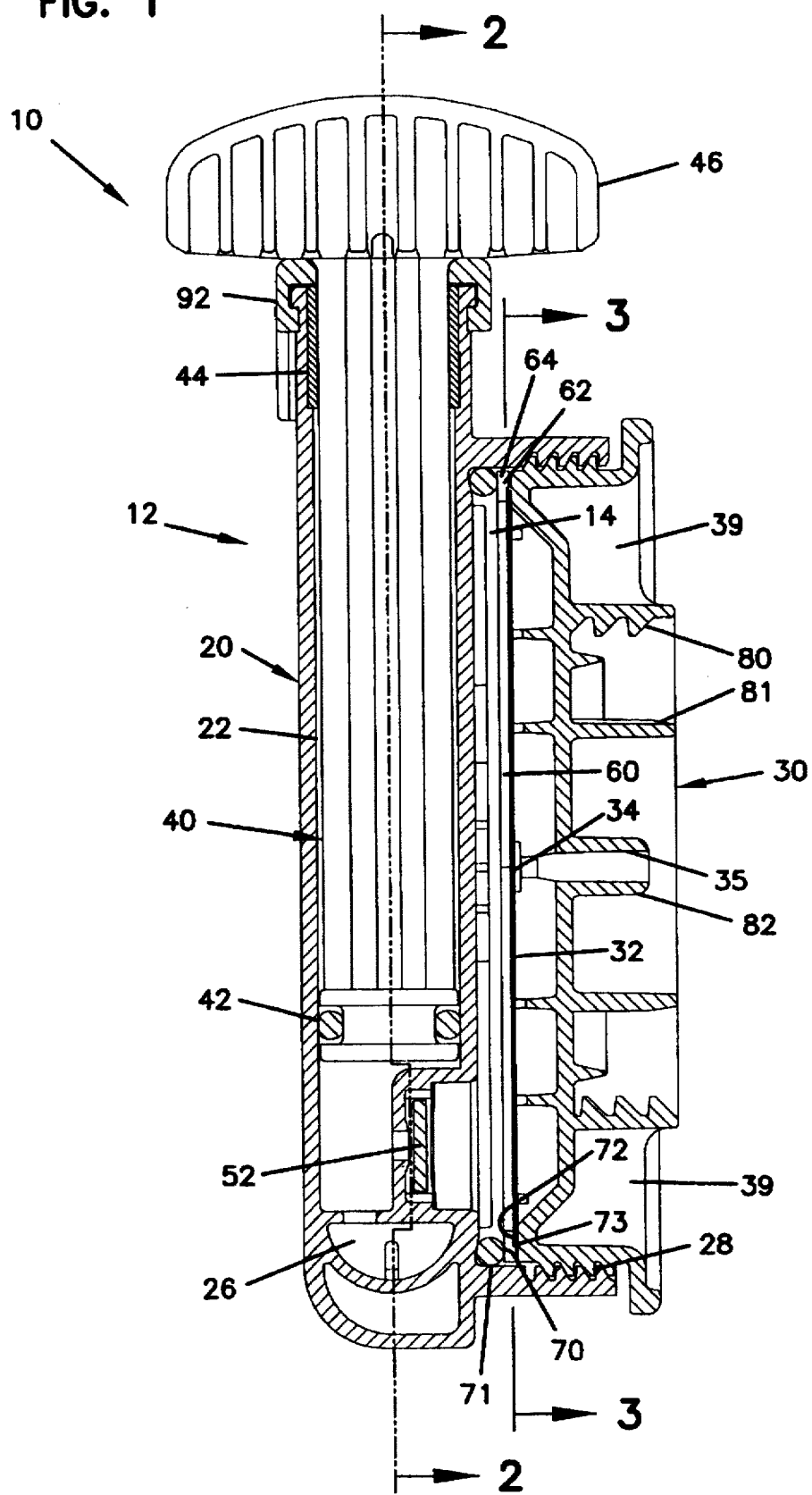
FIG. 1 is a cross-sectional view of a portable water treatment device according to the present invention.
Figure 2:
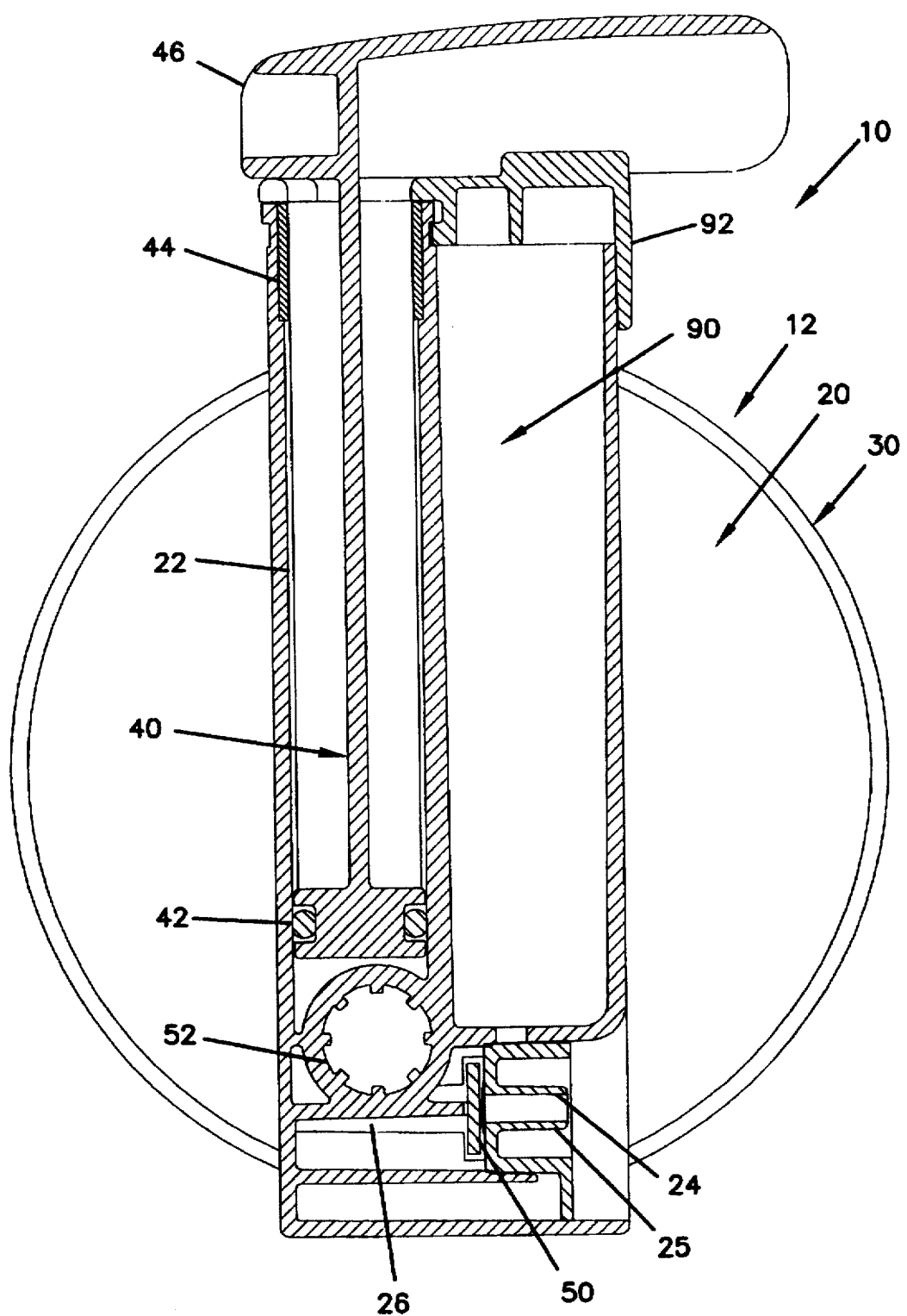
FIG. 2 is a cross-sectional view of the portable water treatment device shown in FIG. 1, as viewed generally from section 2—2 in FIG. 1.
Figure 3:
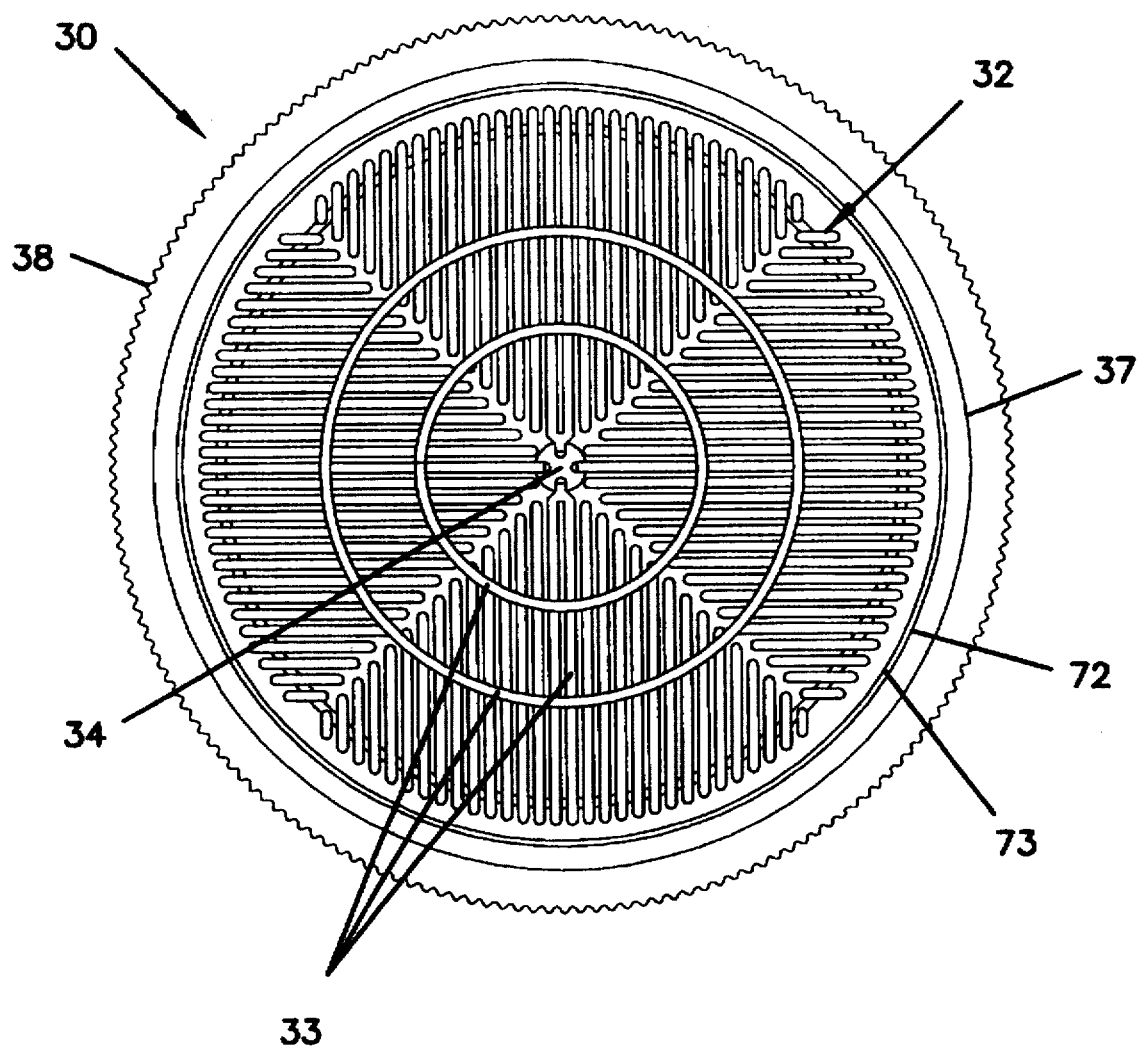
FIG. 3 is a plan view of a cover for the portable water treatment device shown in FIG. 1, as viewed generally from section 3—3 in FIG. 1.

Referring now to the drawings, wherein like numerals designate like parts, a low-cost portable water treatment device 10 is shown in FIGS. 1–3.

Referring to FIGS. 1 and 2, water treatment device 10 has a housing 12 which includes pump body 20 and cover 30. Pump body 20 includes plunger chamber 22 in which plunger 40 is received. Plunger 40 is sealed in plunger chamber 22 by o-ring 42 at its lower end and by bushing 44 at the upper end of plunger chamber 22. Bushing 44 also acts as a stop to define the limit of the upward stroke of plunger 40.

Water is forced by plunger 40 through water treatment device 10 as follows. When handle 46 is pulled to withdraw plunger 40, contaminated water is drawn into inlet 24 of pump body 20. Inlet 24 comprises intake barb 25 onto which an intake hose (not shown) is friction fit. As is typically the case, the opposite end of the intake hose includes a prefilter (150 micron in the preferred embodiment) and an adjustable hose float (also not shown).

Water is forced past first one-way valve 50, through passage 26 and into plunger chamber 22, filling plunger chamber 22 with contaminated water when plunger 40 is fully withdrawn. Upon depression of plunger 40, water flows past second one-way valve 52 (first one-way valve 50 being forced closed) and into water filtration chamber 14. One-way valves 50, 52 are rubber check-type valves commonly known in the art.

The contaminated water is then purified by passing through filter 60. Filter 60 is supported on its downstream side by a grid of ribs 32 (best shown in FIG. 3), which prevent the relatively thin filter media 60 from rupturing due to differential pressure. Ribs 32 are constructed to form channels 33 which direct the flow of purified water to center 34 of cover 30, and out outlet 35.

Cover 30 includes two adaptors 80, 81 and an outlet barb 82 to permit pumping of purified water into containers of different sizes. First adaptor 80 includes internal threads sized to receive a standard NALGENE™ bottle (not shown). Second adaptor 81 has a tapered outer surface for receiving a smaller standard sized bottle (also not shown). Finally, outlet barb 82 is for an outlet hose (not shown), which can be used to dispense purified water into a container of any size.

It will be appreciated that plunger 40, one-way valves 50, 52 and the various flow passages and chambers, e.g., 14, 22, 26 could be constructed and arranged in a number of different ways within the principles of the invention. For example, the action of plunger 40 could be reversed such that water is drawn into the plunger chamber upon depression and through the filter upon withdrawal. Also, plunger and water filtration chambers 22, 14 and the passages between them could be configured and arranged differently. Also, one-way valves 50, 52 could be positioned at a number of different places, and the device could be constructed to require more than two one-way valves or only a single one-way valve.

Filter 60 is sealed in water treatment device 10 by compressing peripheral portion 62 of filter 60 between first 70 and second 72 annular sealing surfaces. Second annular sealing surface 72 is on cover 30, and first annular surface 70 is an outwardly facing side of o-ring 71 held in pump body 20. Second annular sealing surface 72 includes an annular force concentrating ring 73 (best shown in FIG. 3) disposed to engage peripheral portion 62 of filter 60 to provide a more reliable seal. Force concentrating ring 73 is preferably positioned slightly radially inward of the center of o-ring 71 (as shown in FIG. 2) to bias o-ring 71 radially outwardly. Also, the seat for o-ring 71 on pump body 20 biases o-ring 71 in the same direction to assure proper sealing between o-ring 71 and peripheral portion 62 of media 60.

In the preferred embodiment, o-ring 71 is 50 durometer rubber, and cover 30, including sealing surface 72, and pump body 20, including the seat for o-ring 71, are molded thermoplastic. The most critical leak path is between o-ring 71 and peripheral portion 62 of filter 60 due to the high pressure on the upstream side of filter 60, which can reach 60 psi above atmospheric. While the downstream side of filter 60 will reach lower pressures (approximately 5 psi above atmospheric maximum), the pressure is still sufficient to provide a potential leak path between sealing surface 72 and peripheral portion 62 of filter 60. Accordingly, force concentrating ring 73 is provided on sealing surface 72 to minimize leakage on the downstream side. It is preferable that threads 28, 37 are designed so as to vent any leakage to the outer atmosphere, or that some other vent is provided. This prevents the possibility of contaminated water leaking to the downstream side of filter 60 and mixing with purified water.

First 70 and second 72 annular sealing surfaces could be a number of suitable surfaces other than o-ring 71 and sealing surface 72 on cover 30. For example, peripheral portion 62 could be compressed between two o-rings or between two more rigid sealing surfaces, depending on the gasketing capability of peripheral portion 62 of filter 60. Also, the compression need not necessarily occur primarily through axial forces as in the preferred embodiment, but radial forces could be used as well, as for example if one or both of the annular sealing surfaces is slanted.

When filter 60 has reached the end of its useful life, it is replaced by unthreading cover 30 from pump body 20, removing the old filter, inserting a new filter, and threading cover 30 back into pump body 20 until peripheral portion 62 is compressed, thereby sealing the new filter. To make threading and unthreading easier, cover 30 is provided with teeth 38 (shown in FIG. 3) and eight circumferentially spaced ribs 39 (shown in FIG. 2).

It will be appreciated that a number of other mechanisms could be employed to provide the clamping force necessary to seal filter 60. For example, a plurality of peripheral bolts or clamps could be employed. Also, cover 30, and for that matter pump body 20, need not be circular in shape, but could be polygonal or some other suitable shape.

Filter 60 comprises a media in the form of a flat disk. A non-pleated, thin flat media was chosen because of its cost and space advantages. As with cover 30 and pump body 20, filter 60 could be a number of shapes other than circular, so long as a suitable filtration surface area is provided.

Media 60 is preferably fibrous, such as glass, plastic or wood, but it could also be non-fibrous, such as powdered metal or ceramic. A glass fiber media is employed in the preferred embodiment because of its perceived performance advantages. The preferred media includes two glass fiber layers laminated together with a thermoplastic binder. The first layer is 5.0 micron glass media, and the second layer is 0.5 micron glass media. It will be appreciated that the contaminant size filtration of the two layers could be varied in a number of suitable combinations, with the first layer filtering contaminants between 1.0 and 10.0 microns, and the second layer filtering contaminants between 0.2 and 4.0 microns. Also, a single layer or more than two layers could be employed, and the thickness of the media could be varied within the principles of the invention. For example, while the preferred two-layer media is 0.050 inches thick, single or multiple layer media from 0.010 to 0.250 inches in thickness could conceivably be employed.

The peripheral portion 62 of filter media 60 is preferably impregnated with a sealant 64. The sealant used in the preferred embodiment is a one-part, low viscosity solventless silicone which is heat curable. Other suitable sealants could also be used.

Impregnating peripheral portion 62 of filter 60 with a sealant 64 provides a more reliable seal. A potential water leak path is radially outward through the media itself and past sealing surfaces 70, 72. Sealant 64 seals the pores of peripheral portion 62 of media 60 so as to minimize or eliminate such leaks. Also, certain sealants, such as the preferred sealant, will give peripheral portion 62 elastomeric properties, thereby improving sealing with first and second sealing surfaces 70, 72. It will be appreciated that peripheral portion 62 could be modified in a number of other suitable ways to provide the desired gasketing properties, such as being sealed in a frame having appropriate sealing surfaces.

The filter 60 of the present invention is manufactured as follows. A roll stock of two-layer glass fiber sheet is provided. A disk of appropriate diameter (approximately 4.0 inches in the preferred embodiment) is then cut from the sheet by punching or stamping. Held vertically under vacuum pressure, the disk is then spun with peripheral portion 62 dipped in a bath of sealant. Once the sealant is cured, filter 60 is ready to be used. It will be understood that the manner of performing the various steps could be varied within the principles of the invention.

Referring to FIG. 2, housing 12 has a storage compartment 90 connected thereto for holding a spare filter (not shown). In the preferred embodiment, storage compartment 90 is formed as part of pump body 20 along side plunger chamber 22. It is shaped substantially as an elongated cavity suitable for holding one or more disk filters 60 of the preferred embodiment rolled into a tubular shape. Storage compartment 90 is closed by cap 92, which rotates out of the way (as does plunger handle 46) for access to compartment 90. It will be appreciated that storage compartment 90 could be connected to housing 12 in a number of different ways, and that it could have any of a number of different configurations suitable for a particularly sized and shaped replacement filter.

It should be understood that the present invention is not limited to the preferred embodiment discussed above, which is illustrative only. Changes may be made in detail, especially in matters of shape, size, arrangement of parts, order of steps or material of components within the principles of the invention, to the full extent indicated by the broad general meanings of the terms in which the appended claims are expressed.

What is claimed is:

1. A portable water treatment device having a replaceable filter, comprising:
   (a) a pump body having a plunger chamber for receiving contaminated water;
   (b) a cover releasably connected to said pump body to define a water filtration chamber, said cover having an outlet for purified water;
   (c) a filter in said water filtration chamber comprising a disk having a compressible peripheral portion disposed between first and second annular sealing surfaces, said peripheral portion being compressed by said cover and pump body when said cover is connected to said pump body; and
   (d) a plunger received within said plunger chamber, for forcing contaminated water from said plunger chamber, into said water filtration chamber and through said filter to produce purified water exiting from said outlet of said cover.

2. A portable water treatment device according to claim 1, wherein said second annular sealing surface is on said cover and axially compresses said peripheral portion of said filter against said first annular sealing surface.

3. A portable water treatment device according to claim 2, wherein said second annular sealing surface includes an annular force concentrating ring disposed from said surface to engage said peripheral portion of said filter.

4. A portable water treatment device according to claim 1, wherein said first annular sealing surface is an elastomeric ring in said pump body.

5. A portable water treatment device according to claim 1, wherein said filter comprises fibrous material and said peripheral portion is impregnated with a sealant.

6. A portable water treatment device according to claim 5, wherein said filter comprises a plurality of fibrous material layers secured together.

7. A portable water treatment device according to claim 5, wherein said sealant comprises silicone.

8. A portable water treatment device according to claim 1, wherein said cover includes a grid of ribs supporting a downstream surface of said filter, arranged to prevent rupture of said filter due to differential pressure.

9. A portable water treatment device according to claim 8, wherein said ribs are constructed and arranged to channel purified water to a center of said cover and out said outlet of said cover.

10. A portable water treatment device according to claim 1, wherein said cover is connected to said pump body by mating threads.

11. A portable water treatment device according to claim 10, wherein said mating threads comprise external threads on said cover and internal threads on said pump body.

12. A portable water treatment device according to claim 1, wherein water is drawn into said plunger chamber when said plunger is withdrawn and water is forced through said filter when said plunger is depressed.

13. A portable water treatment device, comprising:
   (a) a housing having an inlet, an outlet and a water filtration chamber;
   (b) a replaceable filter in said water filtration chamber comprising a disk having a compressible peripheral portion;
   (c) means for compressing said peripheral portion to sealingly separate purified water from contaminated water; and
   (d) means in said housing for forcing contaminated water into said inlet, through said filter and out said outlet, thereby producing purified water.

14. A portable water treatment device according to claim 13, wherein said compressing means comprise an annular sealing surface on a cover of said housing and an elastomeric ring in a remainder of said housing, said annular sealing surface having an annular force concentrating ring disposed from said surface to engage said peripheral portion of said filter.

15. A portable water treatment device according to claim 13, wherein said forcing means comprise a plunger in a plunger chamber of said housing.

16. A portable water treatment device according to claim 13, wherein said replaceable filter comprises fibrous material and said peripheral portion is impregnated with a sealant.

17. A portable water treatment device according to claim 13, wherein said housing includes on a downstream side of said replaceable filter a grid of supporting ribs arranged to prevent rupture of said filter due to differential pressure.

18. A filter for water filtration, comprising a disk including fibrous material and having a peripheral portion impregnated with a sealant, said impregnated peripheral portion being compressible so as to provide a seal.

19. A filter according to claim 18, wherein said disk comprises a plurality of fibrous material layers secured together.

20. A filter according to claim 19, wherein a first layer filters larger contaminants between 1.0 and 10.0 microns and a second layer filters smaller contaminants between 0.2 and 4.0 microns.

21. A filter according to claim 18, wherein said fibrous material comprises glass fibers.

22. A filter according to claim 18, wherein said sealant comprises silicone.

* * * * *